United States Patent
Cruz Solis et al.

(10) Patent No.: US 10,025,424 B2
(45) Date of Patent: Jul. 17, 2018

(54) VEHICLE WITH HEADLIGHT CONTROL

(71) Applicant: Ford Global Technologies, LLC, Dearborn, MI (US)

(72) Inventors: Fernando Cruz Solis, Tlalnepantla de Baz (MX); Tania Garcia, Cuautitaln Izcalli (MX); Jhammel Montes, Plymouth, MI (US); Hector Amador, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/237,130

(22) Filed: Aug. 15, 2016

(65) Prior Publication Data
US 2018/0046310 A1  Feb. 15, 2018

(51) Int. Cl.
*G06F 3/0488* (2013.01)
*G06F 3/041* (2006.01)
*B60Q 1/08* (2006.01)
*B60Q 1/00* (2006.01)
(Continued)

(52) U.S. Cl.
CPC .......... *G06F 3/0416* (2013.01); *B60Q 1/0023* (2013.01); *B60Q 1/08* (2013.01); *B60R 1/00* (2013.01); *G06F 3/0412* (2013.01); *G06K 9/00791* (2013.01); *B60R 2300/50* (2013.01)

(58) Field of Classification Search
CPC ...... G06F 3/0488; G06F 3/0484; G06F 13/14; G06F 3/04842; G06F 3/017; G06F 2201/81; B60R 1/00; B60R 11/04; B60R 1/1207; B60R 2011/0084; B60R 2300/105; B60R 2300/103; B60R 1/04; B60R 2001/1253; B60R 2011/004; B60R 1/025; B60R 2300/106; B60R 2300/8026; B60R 2300/804; B60R 2300/8053; B60R 2300/308; B60R 2300/101;
(Continued)

(56) References Cited

U.S. PATENT DOCUMENTS 5,170,220 A * 12/1992 Matsumoto .......... G01M 11/064
356/121
8,180,547 B2   5/2012 Prasad et al.
(Continued)

FOREIGN PATENT DOCUMENTS

CN       202528898 U      11/2012
CN       105667386 A       6/2016
(Continued)

OTHER PUBLICATIONS

Unpublished pending U.S. Appl. No. 14/991,496, filed Jan. 8, 2016, pursuant to the Commissioner's Notice dated Sep. 21, 2004.
(Continued)

*Primary Examiner* — Duc Q Dinh
(74) *Attorney, Agent, or Firm* — James P. Muraff; Neal, Gerber & Eisenberg LLP

(57) ABSTRACT

A vehicle including: a headlight that produces a beam, a touchscreen, a camera, processor(s) configured to: (a) display images captured by the camera on the touchscreen; (b) recast the beam according to touch inputs on the images; (c) disable (b) when the vehicle exceeds a predetermined speed; (d) recast the beam by sweeping the beam from an original position to a final position.

20 Claims, 12 Drawing Sheets

(51) Int. Cl.
*G06K 9/00* (2006.01)
*B60R 1/00* (2006.01)

(58) Field of Classification Search
CPC ........ B60R 2300/303; B60R 2300/304; B60R 2300/8093
USPC .................................. 701/41, 42, 69, 72, 74
See application file for complete search history.

(56) References Cited

U.S. PATENT DOCUMENTS

| | | | | |
|---|---|---|---|---|
| 8,285,453 | B2 * | 10/2012 | Schroeder | G01C 21/3641 180/173 |
| 8,410,703 | B2 * | 4/2013 | Le Bars | B60Q 1/085 315/82 |
| 8,433,479 | B2 | 4/2013 | Lukacs et al. | |
| 8,977,008 | B2 * | 3/2015 | Camilleri | B60R 1/00 348/904 |
| 9,789,808 | B1 * | 10/2017 | Hong | B60Q 1/085 |
| 2004/0114379 | A1 | 6/2004 | Miller et al. | |
| 2016/0364111 | A1 * | 12/2016 | Piekny | G06F 3/0488 |

FOREIGN PATENT DOCUMENTS

| | | |
|---|---|---|
| DE | 102008029159 A1 | 12/2009 |
| DE | 202011003404 U1 | 6/2011 |
| EP | 2719580 A1 | 4/2014 |
| EP | 2762359 A1 | 8/2014 |
| EP | 3267097 A1 | 1/2018 |
| JP | H112510774 A | 8/1999 |
| JP | 2002193027 A | 7/2002 |
| JP | 2008149784 A | 7/2008 |
| WO | WO 2015/168218 A2 | 11/2015 |
| WO | WO 2016/200647 A1 | 12/2016 |

OTHER PUBLICATIONS

Search Report dated Jan. 25, 2018, for GB Patent Application No. 1712834.9 (5 pages).

\* cited by examiner

US 10,025,424 B2

VEHICLE WITH HEADLIGHT CONTROL

TECHNICAL FIELD

This disclosure relates to vehicle headlights.

BACKGROUND

Some vehicles include adaptive headlights (a left adaptive headlight and a right adaptive headlight). The headlights emit beams of light (i.e., beam profiles). The adaptive headlights sweep the beams of light when the vehicle corners during a turn. A solution is needed to enable user-friendly control of the headlights (and thus the beams) via a touchscreen display.

SUMMARY

A vehicle consistent with the present disclosure includes: a headlight that produces a beam, a touchscreen, a camera, processor(s) configured to: (a) display images captured by the camera on the touchscreen; (b) recast the beam according to touch inputs on the images; (c) disable (b) when the vehicle exceeds a predetermined speed; (d) recast the beam by sweeping the beam from an original position to a final position.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
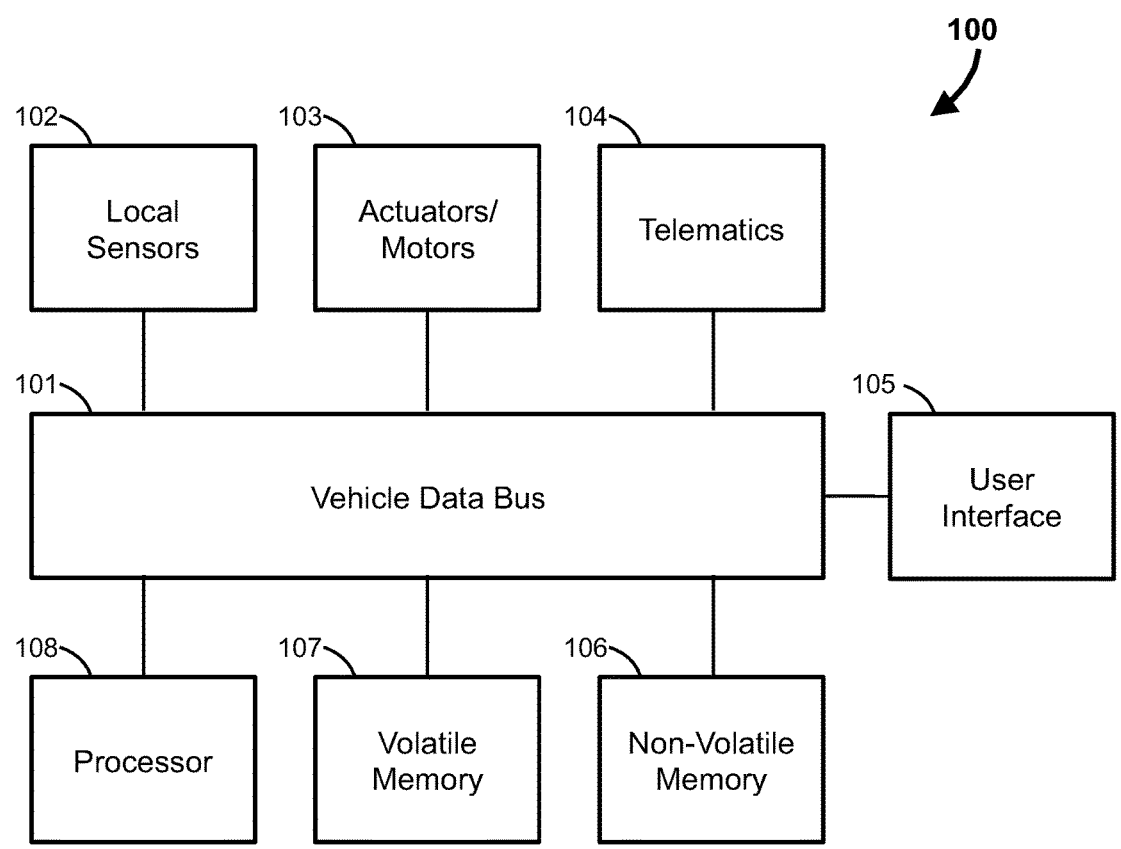
FIG. 1 is a block diagram of a vehicle computing system.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present, as one option, and mutually exclusive alternatives as another option. In other words, the conjunction "or" should be understood to include "and/or" as one option and "either/or" as another option.

FIG. 1 shows a computing system 100 of an example vehicle 200. The vehicle 200 is also referred to as a first vehicle 200. The vehicle 200 includes a motor, a battery, at least one wheel driven by the motor, and a steering system configured to turn the at least one wheel about an axis. Vehicles are described, for example, in U.S. patent application Ser. No. 14/991,496 to Miller et al. ("Miller") and U.S. Pat. No. 8,180,547 to Prasad et al. ("Prasad"), both of which are hereby incorporated by reference in their entireties.

The computing system 100 enables automatic control of mechanical systems within the device. The computing device 100 also enables communication with external devices. The computing system 100 includes a data bus 101, one or more processors 108, volatile memory 107, non-volatile memory 106, user interfaces 105, a telematics unit 104, actuators and motors 103, and local sensors 102.

The data bus 101 traffics electronic signals or data between the electronic components. The processor 108 performs operations on the electronic signals or data to produce modified electronic signals or data. The volatile memory 107 stores data for immediate recall by the processor 108. The non-volatile memory 106 stores data for recall to the volatile memory 107 and/or the processor 108. The non-volatile memory 106 includes a range of non-volatile memories including hard drives, SSDs, DVDs, Blu-Rays, etc. The user interface 105 includes displays, touch-screen displays (e.g. touchscreen 105a), keyboards, buttons (e.g., directional controller 105b), and other devices that enable user interaction with the computing system. The telematics unit 104 enables both wired and wireless communication with external processors via Bluetooth, cellular data (e.g., 3G, LTE), USB, etc. The telematics unit 104 may be configured to broadcast signals at a certain frequency.

The actuators/motors 103 produce physical results. Examples of actuators/motors include fuel injectors, steering, a motor for transmitting torque to wheels, windshield wipers, brake light circuits, headlight circuits, transmissions, airbags, haptic motors or engines etc. The local sensors 102 transmit digital readings or measurements to the processor 108. Examples of suitable sensors include temperature sensors, rotation sensors, seatbelt sensors, speed sensors, cameras, lidar sensors, radar sensors, ultrasonic sensors, infrared sensors, etc. It should be appreciated that the various connected components of FIG. 1 may include separate or dedicated processors and memory. Further detail of the structure and operations of the computing system 100 is described, for example, in Miller and/or Prasad.

Figure 2:
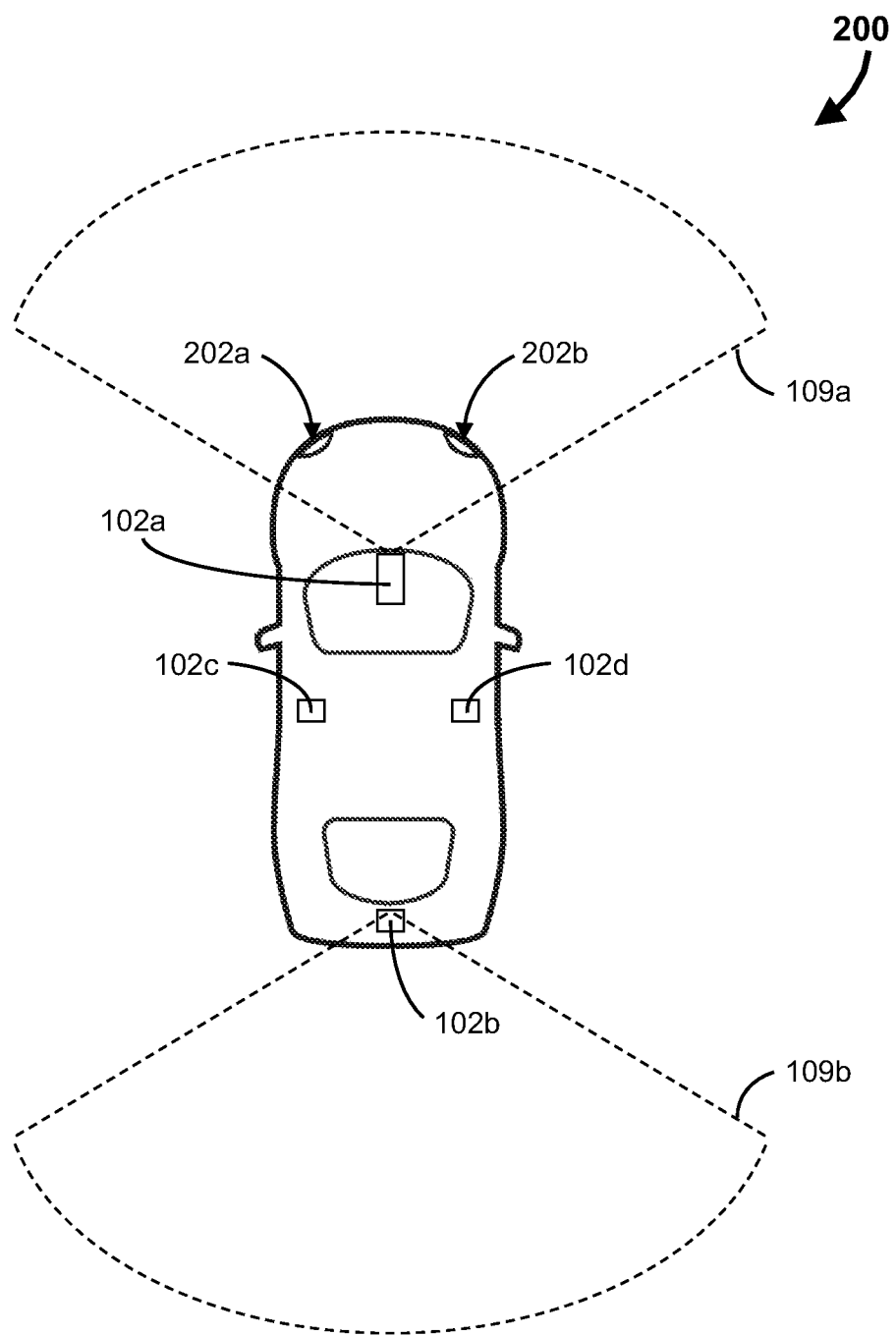
FIG. 2 is a schematic of a vehicle including the vehicle computing system.

FIG. 2 generally shows and illustrates the vehicle 200, which includes the computing system 100. Although not shown, the vehicle 200 is in operative wireless communication with a nomadic device, such as a mobile phone. Some of the local sensors 102 are mounted on the exterior of the vehicle 200. Local sensor 102a may be an ultrasonic sensor, a lidar sensor, a camera, a video camera, and/or a microphone, etc. Local sensor 102a may be configured to detect objects leading the vehicle 200 as indicated by leading sensing range 109a. Local sensor 102b may include one or more of an ultrasonic sensor, a lidar sensor, an infrared sensor, a camera, a video camera, and/or a microphone, etc. Local sensor 102b may be configured to detect objects trailing the vehicle 200 as indicated by trailing sensing range 109b. Left sensor 102c and right sensor 102d may be configured to perform the same functions for the left and right sides of the vehicle 200. The vehicle 200 includes a host of other sensors 102 located in the vehicle interior or on the vehicle exterior. These sensors may include any or all of the sensors disclosed in Prasad.

It should be appreciated that the vehicle 200 is configured to perform the methods and operations described below. In some cases, the vehicle 200 is configured to perform these functions via computer programs stored on the volatile and/or non-volatile memories of the computing system 100. A processor is "configured to" perform a disclosed operation when the processor is in operative communication with memory storing a software program with code or instructions embodying the disclosed operation. Further description of how the processor, memories, and programs cooperate appears in Prasad. It should be appreciated that the nomadic device and/or an external server in operative communication with the vehicle 200 perform some or all of the methods and operations discussed below.

According to various embodiments, the vehicle 200 includes the features of vehicle 100a of Prasad. According to various embodiments, the computing system 100 includes the features of VCCS 102 of FIG. 2 of Prasad. According to various embodiments, the vehicle 200 is in communication with some or all of the devices shown in FIG. 1 of Prasad, including the nomadic device 110, the communication tower 116, the telecom network 118, the Internet 120, and the data processing center 122.

The term "loaded vehicle," when used in the claims, is hereby defined to mean: "a vehicle including: a motor, a plurality of wheels, a power source, and a steering system; wherein the motor transmits torque to at least one of the plurality of wheels, thereby driving the at least one of the plurality of wheels; wherein the power source supplies energy to the motor; and wherein the steering system is configured to steer at least one of the plurality of wheels." The term "equipped electric vehicle," when used in the claims, is hereby defined to mean "a vehicle including: a battery, a plurality of wheels, a motor, a steering system; wherein the motor transmits torque to at least one of the plurality of wheels, thereby driving the at least one of the plurality of wheels; wherein the battery is rechargeable and is configured to supply electric energy to the motor, thereby driving the motor; and wherein the steering system is configured to steer at least one of the plurality of wheels."

Figure 3:
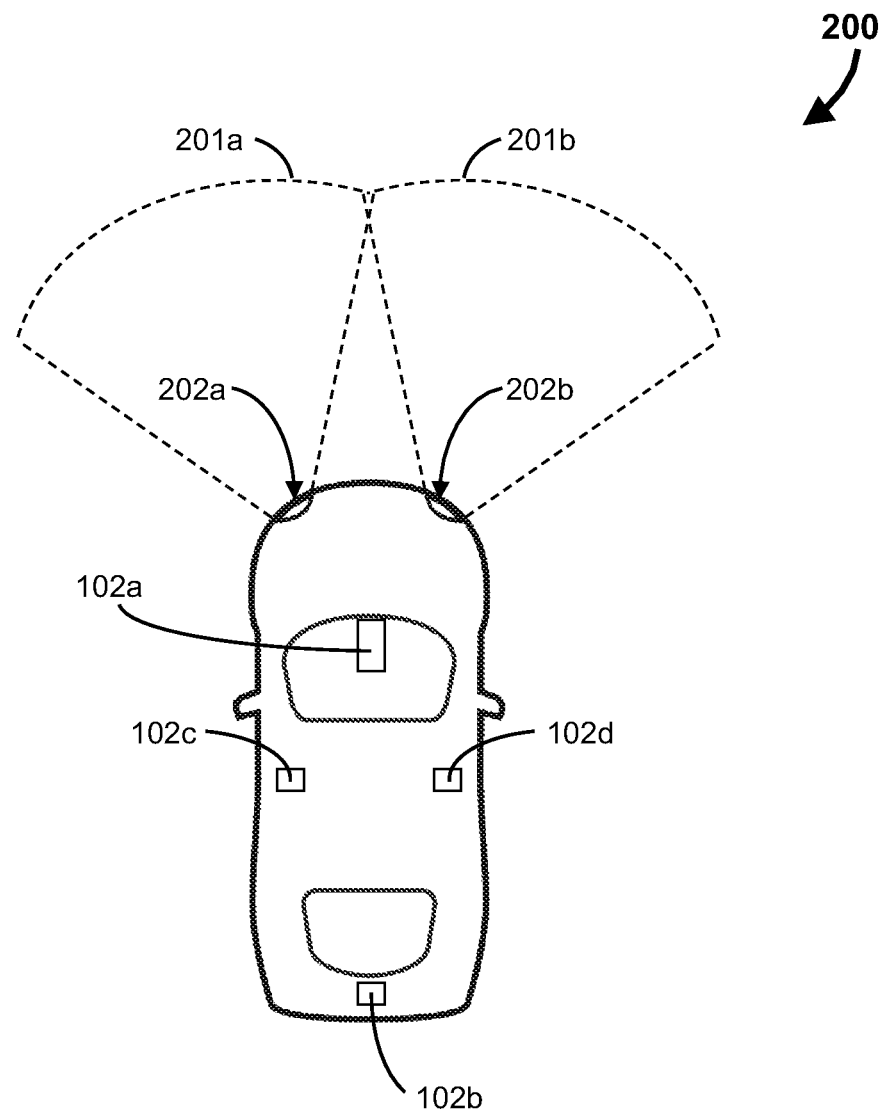
FIG. 3 is a schematic of the vehicle.

As shown in FIGS. 2 and 3, the vehicle 200 includes a left headlight 202a and a right headlight 202b. The headlights 202 are adaptive, meaning that the headlights 202 are configured, during adaptive steering, to project a beam of light having a profile based on a steering angle and/or velocity of the vehicle 200. According to various embodiments, the headlights 202 have the structure of the headlamp system 10 described in U.S. Pat. No. 8,433,479 to Lukacs et al. ("Lukacs"), which is hereby incorporated by reference in its entirety.

One of the headlights 202 may have the configuration shown in FIG. 1 of Lukacs. The other headlight 202 may have a mirror of the configuration shown in FIG. 1 of Lukacs. According to various embodiments, the vehicle 200 is configured to control the headlights 202 via some or all of the functions and operations described in Lukacs and thus the vehicle 200 of the present invention may share some or all of the features of the vehicle described in Lukacs.

As shown in FIG. 1 of Lukacs, the headlights 202 of the present invention may each include a main light source and a plurality of supplementary light sources. As shown in FIG. 2 of Lukacs, the vehicle 200 of the present invention may adjust beams of the headlights by activating, deactivating, and/or adjusting the supplementary light sources. As shown in FIG. 3 of Lukacs, the vehicle 200 of the present invention adjusts the beams, during adaptive steering, based on a steering angle and vehicle speed (when adaptive steering is active).

Alternatively or in addition to the supplementary light sources, the vehicle 200 may be configured to rotate the main light source about (a) a vertical axis (similar to a lighthouse) and (b) a horizontal axis. One or more motors drive the rotation of the main light source. When adaptive steering is active, the vehicle controls the motors based on the steering angle and the vehicle speed.

It should thus be appreciated that the vehicle 200 is equipped to recast or adjust headlight beams via least one of two possible configurations: (a) by rotating the headlight about a vertical axis and a horizontal axis via one or more motors; (b) by activating, deactivating, and/or adjusting power to a main headlight and supplemental headlights to sweep the beam horizontally and/or vertically.

The discussion that follows relates to recasting or adjusting beams of the headlights 202 according to user inputs received via the touchscreen 105a and/or the directional keypad 105b. According to various embodiments, user adjustment of the beams according to the below-described methods is only available when the vehicle is in park. According to various embodiments, user adjustment of the beams is automatically disabled when the vehicle is detected to exceed a certain predetermined speed (e.g., 0 mph or 10 mph).

When the vehicle recasts or adjusts the beams of the headlights, the beams emanating the headlights sweep from their original position to their new or selected position. As stated above, the new or selected position may be horizontally and/or vertically spaced from the original position.

When the vehicle 200 is equipped with configuration (a), the vehicle 200 commands the one or more motors to (i) turn the headlight around the vertical axis to a new horizontal position and (ii) turn the headlight about the horizontal axis (i.e., the axis parallel to the vehicle axles) to a new or selected vertical position. The beam thus sweeps from an original position to the new user-specified position.

When the vehicle 200 is equipped with configuration (b), the vehicle 200 may simulate rotation (and thus achieve the sweeping effect) by sequencing through a series of predetermined beam profiles (each beam profile being associated with a main headlight power level and a supplemental headlight power level for each of the supplemental headlights).

For example, the vehicle 200 may achieve a beam profile (1) by activating the main headlight and none of the supplemental headlights to cast a beam that extends generally parallel with straight road. The vehicle 200 may achieve a beam profile (2) by activating the main headlight and some of the supplemental headlights to cast a beam that extends at a 5 degree horizontal angle with respect to generally straight road and a 5 degree vertical angle with respect to generally straight road. The vehicle 200 may achieve a beam profile (3) by activating the main headlight and all of the supplemental headlights to cast a beam that extends at a 10 degree horizontal angle with respect to generally straight road and a 10 degree vertical angle with respect to generally straight road. By sequencing through profiles (1), (2), and (3), the selected headlight sweeps from profile (1) to profile (3). It should be appreciated that both headlights may sweep simultaneously and that one headlight may sweep independently of the other headlight.

Figure 4:
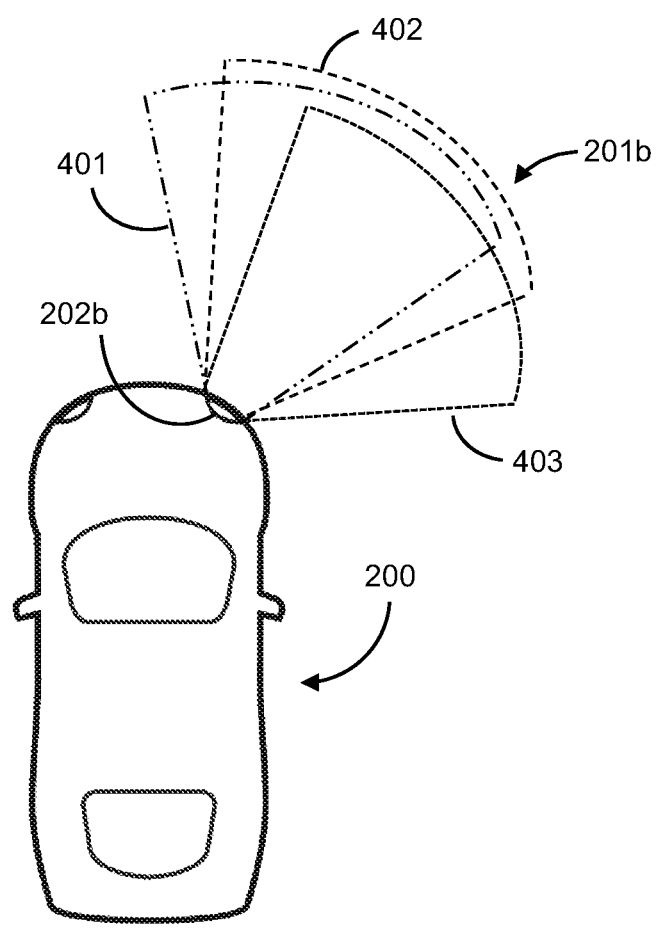
FIG. 4 shows various beam profiles.

FIG. 4 generally shows and illustrates three beam profiles. The vehicle 200 cycles between a first beam profile 401, a second beam profile 402, and a third beam profile 403. The first beam profile 401 may be beam profile (1), the second beam profile 402 may be beam profile (2), and the third beam profile 403 may be beam profile (3). The first beam profile 401 is parallel with the road. The second beam profile 402 is at a horizontal angle X and a vertical angle Y with respect to the road. The third beam profile 403 is at a horizontal angle 2*X and a vertical angle 2*Y with respect to the road.

When the vehicle 200 is equipped with configuration (b), the vehicle 200 simulates headlight rotation (i.e., generates the sweeping effect) by sequencing through the beam profiles according to the following array: [beam profile (1), beam profile (2), beam profile (3)], assuming that beam profile (1) corresponds to the original position and beam profile (3) corresponds to the user-specified final position. With additional beam profiles (e.g., 20 beam profiles), the vehicle 200 can produce a more authentic simulation of rotation.

Referring to FIGS. 5 to 10, the vehicle 200 includes a touchscreen display 105*a*, which is mounted on a dashboard of the vehicle. The vehicle 200 is configured to present a most recent image captured by the leading local sensor 102*a* on the display 105*a*. When the leading local sensor 102*a* is a video camera, the image updates at a predetermined frequency (e.g., 24 times per second). Although the leading local sensor 102*a* is shown as being mounted on the windshield in FIG. 3, the leading local sensor 102*a* may be located in any suitable location (e.g., mounted just above a front bumper of the vehicle 200).

In FIGS. 5 to 10, the leading local sensor 102*a* (e.g., the video camera) has captured ground or pavement 502, an object 504 (e.g., a box), horizon 501, and sky 503. The image presented on the display 105*a* represents the current view of the leading local sensor 102*a*. As the view changes (e.g., a vehicle travels across the ground or pavement 502), the image presented on the display 105*a* will update accordingly. Put differently, the displayed image is one frame of a video made up of a plurality of frames per second.

Figure 5:
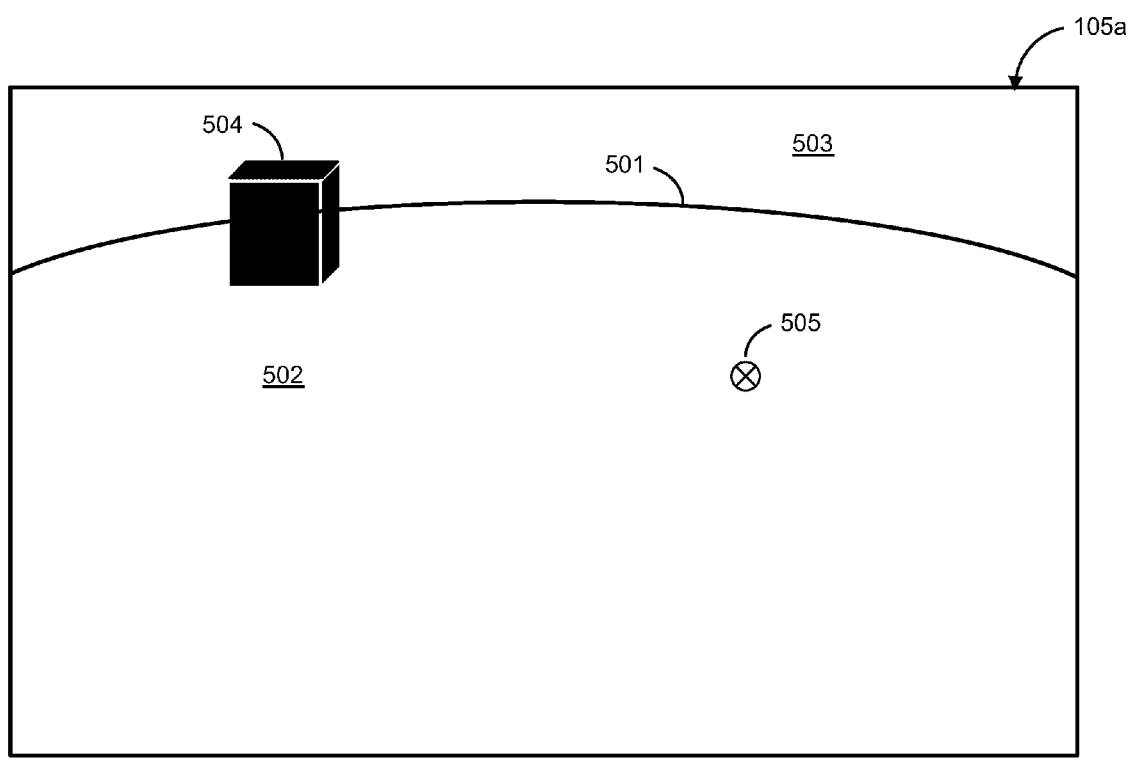
FIGS. 5 to 10 show a user interface with an image background and various features overlaid on the image.
Figure 6:
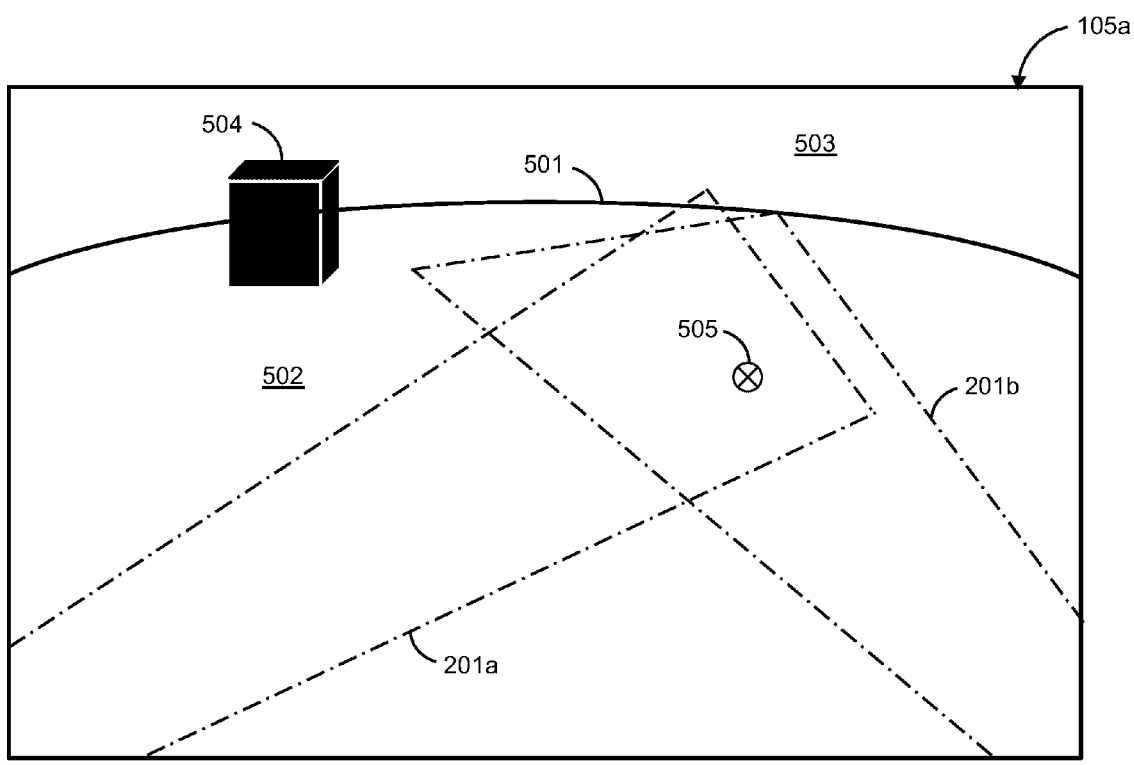

As shown in FIG. 5, the present invention enables the user to place an icon 505 on the image. The user may place the icon 505 by touching or pressing on the touchscreen display 105*a*. In response, one or both of the headlights 201, 202 sweep from their current positions to point at the location 505. With reference to FIG. 6, the left beam 201*a* of the left headlight 202*a* and the right beam 201*b* of the right headlight 202*b* now point at the icon 505. More specifically, and as discussed below, the headlights "point" by casting a beam associated with a zone that encompasses or confines the icon 505 in the two-dimensional space of the touchscreen 105*a*.

Controlling headlight beams poses two problems: First, beam profiles are complicated and do not observe simple geometric relationships due to inherent structural aspects of the headlights (e.g., the shape of the headlight cones). See, for example, FIGS. 3 to 7 of U.S. Patent Publication No. 2004/0114379 to Miller et al. ("Miller-2"), which is hereby incorporated by reference in its entirety. Furthermore, light beams are three-dimensional whereas displays such as the touchscreen display 105*a* are two-dimensional.

Figure 9:
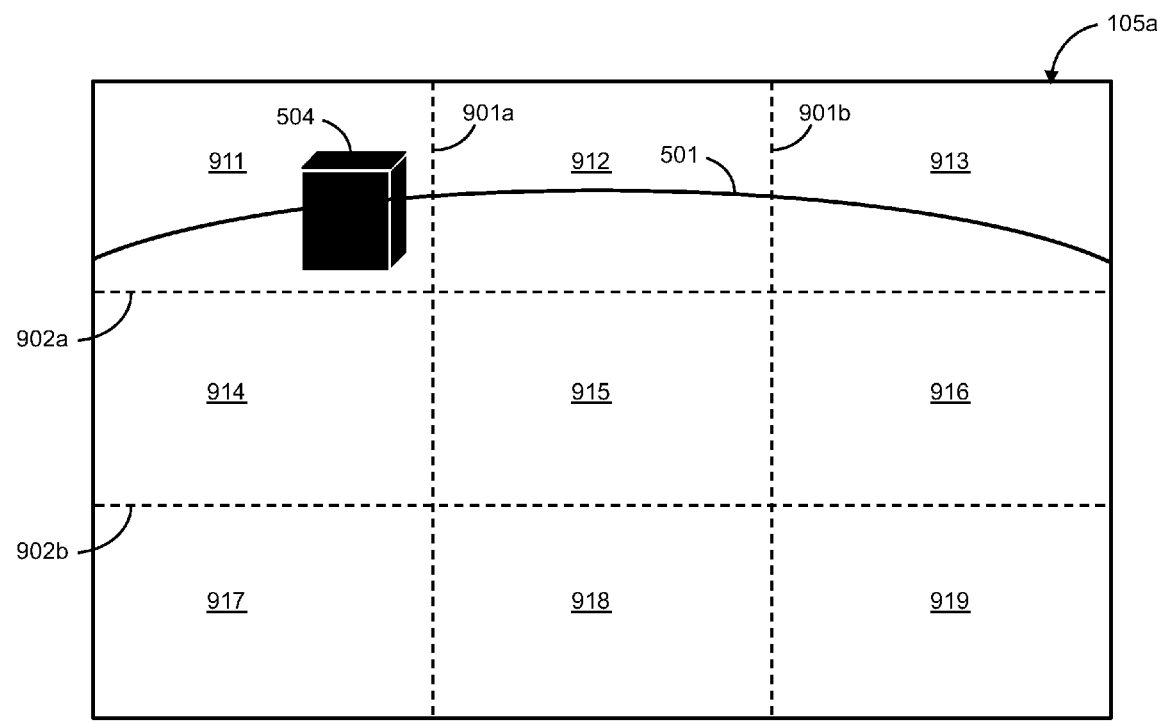

To remedy these problems, the headlights 202 may be calibrated during manufacturing. Each calibration can be represented as a calibration map divided into a plurality of zones, as shown in FIG. 9. Each calibration map (i.e., both of the left headlight calibration map and the right headlight calibration map) associates each pixel of the touchscreen 105*a* with a zone. Each zone maps to (a) a beam profile or (b) no beam profile (i.e., a dead area, as discussed in detail below).

FIG. 9 shows a calibration map of the left headlight. The vehicle includes a similar, but mirrored or reversed, map for the right headlight 202*b*. The calibration map of FIG. 9 segments the image presented on the touchscreen display 105*a*, via vertical dividers 901 and 901*b* and horizontal dividers 902*a* and 902*b*, into a plurality of zones 911 to 919. Each zone 911 to 919 corresponds to (a) one preset left beam profile 202*a* or (b) a dead area. Each zone 911 encompasses at least one pixel of the image, and in preferred embodiments, a plurality of pixels. Although the calibration map of FIG. 9 is shown as occupying the entire touchscreen display 105, it should be appreciated that the calibration map should only overlay the image of the environment leading the vehicle. Thus, if the image occupies less than the entire touchscreen (e.g., the top right corner), then the calibration map is resized to only overlay the portion of the touchscreen showing the image.

When the vehicle is equipped with configuration (a), the vehicle may adjust the motors to recast the beam according to the preset horizontal and vertical angles of the headlight associated with the zone at the time of manufacturing. When the vehicle is equipped with configuration (b), the vehicle illuminates the main headlight and selected supplementary headlights according to the beam associated with the selected zone. In sum and as stated above, each of the zones 911 to 919 maps to (a) a different beam or (b) a dead area (i.e., no beam profile).

Figure 12:
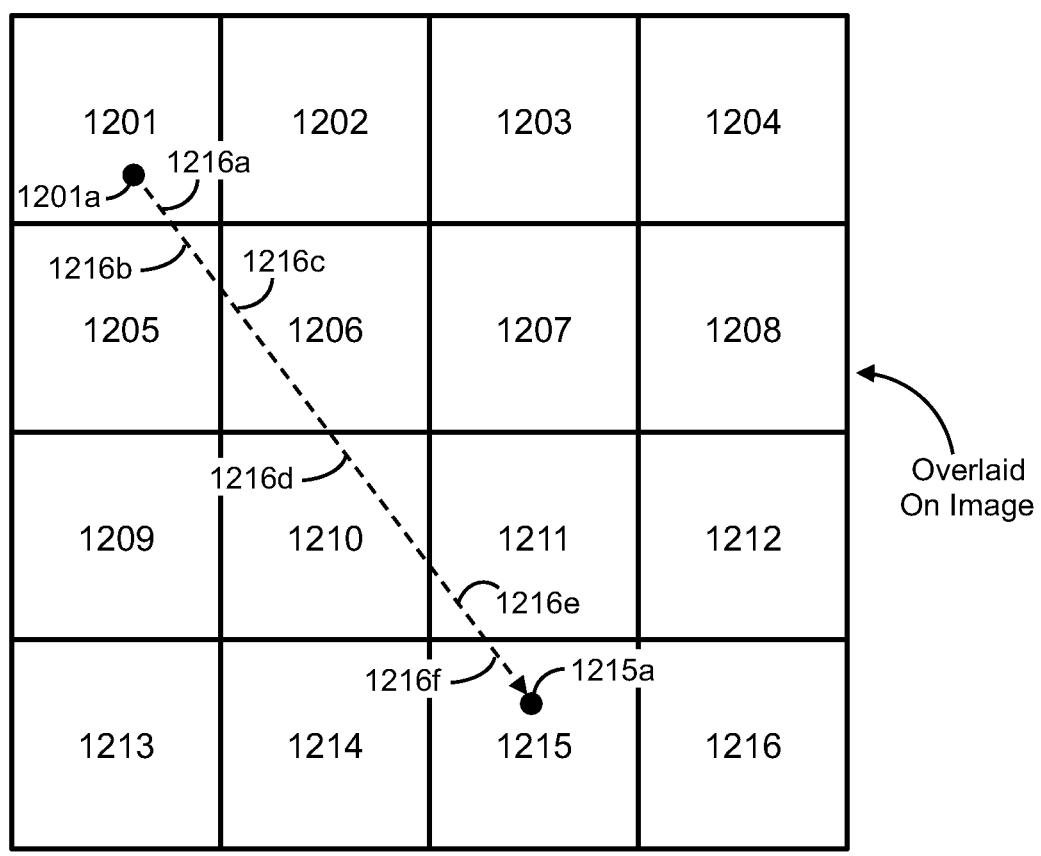
FIG. 12 shows a calibration map with a plurality of zones.

In practice, the segmentation of the zones may be finer than shown in FIG. 9. More specifically, instead of nine discrete zones, the vehicle may include hundreds or thousands of discrete zones. FIG. 12, for example, (discussed below) shows the touchscreen 105*a* being segmented into 16 zones.

Figure 7:
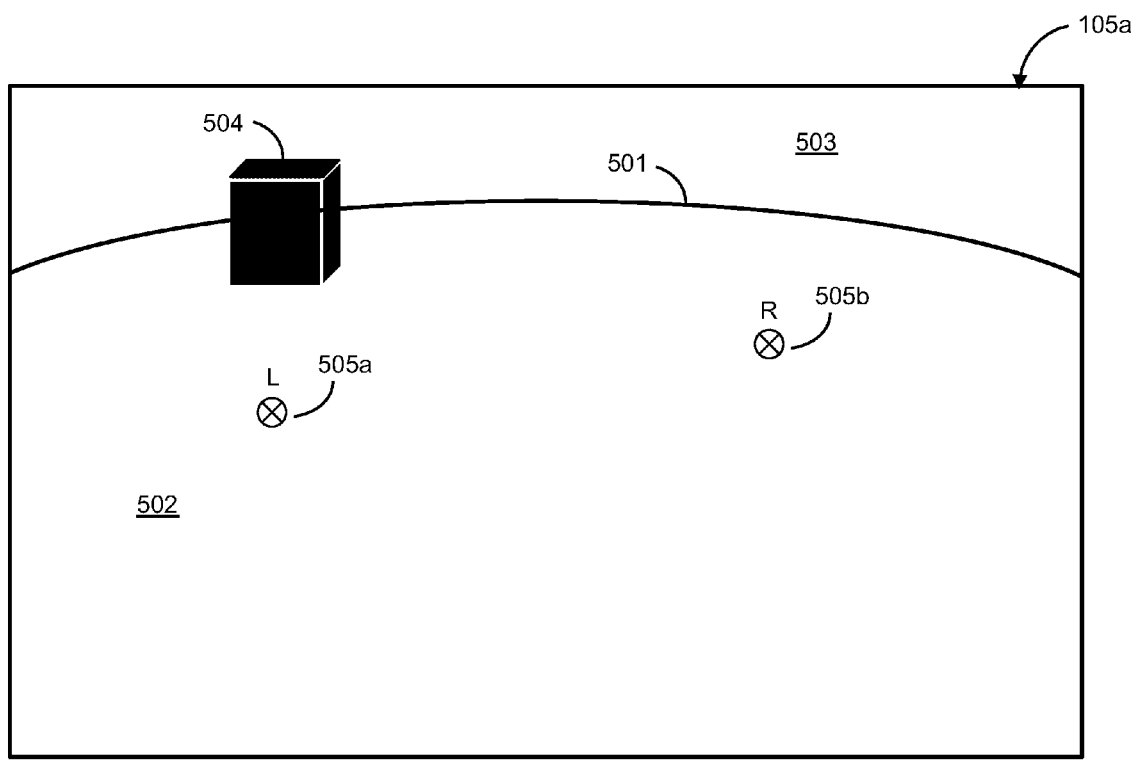

According to various embodiments, and as shown in FIG. 7, the user set a left headlight icon 505*a* and an independent right headlight icon 505*b* to illuminate to different spots. The touchscreen 105*a* displays a toggle (not shown) that enables the user to select either left headlight mode, right headlight mode, or both headlights mode (i.e., dual mode).

After the user actuates the toggle, the user touches the screen to recast the one or more headlights associated with the selected toggle. The vehicle 200 recasts the selected headlight(s) according to calibration map(s) associated with the selected headlight(s) shown in FIG. 9. More specifically, the vehicle 200 recasts the left headlight 202*a* according to the left calibration map and the right headlight 202*b* according to the right calibration map.

As stated above, the vehicle 200 sweeps the beams from their original positions to their final or selected positions. Thus, when the vehicle 200 is equipped with configuration (b), the vehicle sequences through an array of beams including the original beam, one or more intermediate beams, and the final beam. The intermediate beams may correspond to zones located on a path between the original position and the final position. For example, with reference to FIG. 9, if the left headlight was originally pointing at zone 911 and the user touched a pixel inside zone 919, the left headlight would sequence through the following array of beams [zone 911, zone 915, and zone 919]. To find the intermediate profiles, the vehicle may draw or determine a line from a central location (e.g., a midpoint) of the original zone to the central location (e.g., the midpoint) of the final or selected zone, and then sequence through each zone (and thus the headlight profiles associated with the zones) intersected by the line.

When equipped with configuration (b), the vehicle 200 casts the beam associated with each zone of the array for a predetermined time. According to some embodiments, the vehicle 200 applies a zone for a length of time proportional to the length of the segment confined with the zone. FIG. 12 shows the image being segmented into sixteen square zones. The midpoint of zone 1201 is midpoint 1201a. The midpoint of zone 1215 is midpoint 1215a. The element numbers are not overlaid on the image.

With reference to FIG. 12, one of the headlights (e.g., the left headlight 202a) originally casted a beam associated with zone 1201. The user then placed a left headlight icon 505a on the display 105a corresponding to zone 1215. In response, the left headlight beam 201a sweeps from zone 1201 to zone 1215 according to the segment 1216 connecting the midpoint 1201a of zone 1201 to the midpoint 1215a of zone 1215.

The segment 1216 has a first length 1216 confined in zone 1201, a second length 1216b confined in zone 1205, a third length 1216c confined in zone 1206, a fourth length 1216d confined in zone 1210, a fifth length 1216e confined in zone 1211, and a sixth length 1216f confined in zone 1215. The vehicle thus sequences through the following array: [the beam mapped to zone 1201 for a time proportional to length 1216a; the beam mapped to zone 1205 for a time proportional to length 1216b; the beam mapped to zone 1206 for a time proportional to length 1216c; etc.]. Because zone 1215 is the selected or final zone, the vehicle associates an unlimited time with zone 1215 (i.e., applies the beam mapped to zone 1215 without reference to length 12160. According to various embodiments, the vehicle immediately jumps from the original zone to the second zone (e.g., associates a time of zero with zone 1201).

When the vehicle is equipped according to configuration (a), the vehicle plots a first point on a two-dimensional graph having an X coordinate equal to the horizontal angle of the original zone and a Y coordinate equal to the vertical angle of the original zone. The vehicle plots a second point on the two-dimensional graph with an X coordinate equal to the horizontal angle of the final or selected zone and a Y coordinate equal to the vertical angle of the final or selected zone. The vehicle then instructs the one or more motors to sweep the headlight along a segment connecting the first point to the second point at a constant speed. The motors may be stepper motors and thus the headlight may momentarily pause as it follows the segment.

Figure 8:
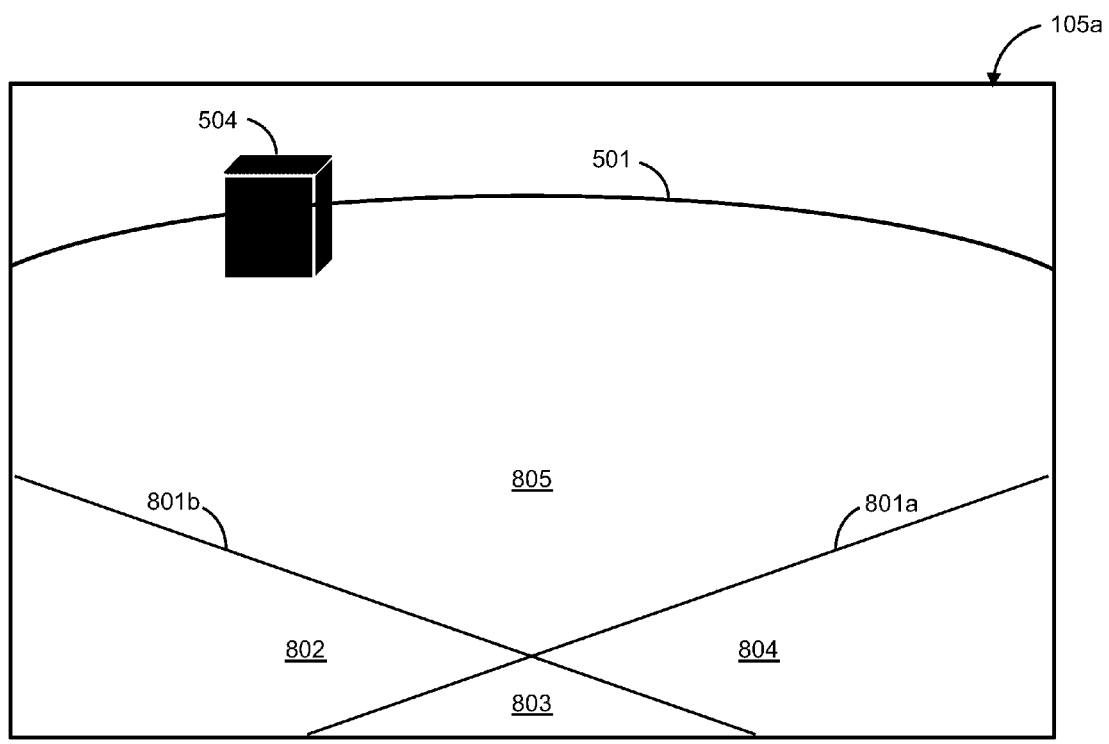

Due to physical constraints (e.g., constraints generated by the geometry of the headlights), the vehicle 200 may be unable to recast the headlights to any position displayed on the touchscreen 105a. FIG. 8 shows left headlight boundary 801a and a right headlight boundary 801b overlaid on the touchscreen 105a. The boundaries divide the image displayed on the touchscreen 105a into areas 802 to 805.

The left headlight 202a is capable of recasting to point at spots within areas 802 and 805. The left headlight 202a is incapable of recasting to point at spots within areas 803 and 804. Areas 803 and 804 are therefore dead areas for the left headlight 202a. The right headlight 202b is capable of recasting to point at spots within areas 804 and 805. The right headlight 202b is incapable of recasting to point at spots within areas 802 and 803. Areas 802 and 803 are therefore dead areas for the right headlight 202b. It should thus be appreciated that area 803 is a dead area for both of the left headlight 202a and the right headlight 202b.

As stated above, the vehicle may overlay boundaries 801 and/or the areas 802 to 805 on the image to guide the user. The boundaries 801 and the areas 802 to 805 may be preloaded into the vehicle 200 at manufacturing. Although the boundaries 801 are shown as being linear, in practice they may resemble steps following perimeters of the calibration zones. For example, with reference to FIG. 12, the right boundary 801b may follow: (a) segment between zones 1214 and 1215, (b) the segment between zones 1210 and 1214, (c) the segment between zones 1209 and 1210, and (d) the segment between zones 1205 and 1209. As a result, zones 1209, 1213, and 1214 would correspond to area 802.

With reference to FIG. 8, one or both of the boundaries 801a and 801b may automatically appear and/or disappear depending on the headlight selected via the toggle. For example, with reference to FIG. 7, if a user toggles to control only the left headlight 202a via the left headlight icon 505a, then only the boundaries and/or areas relevant to the left headlight may be displayed. For example, left headlight boundary 801a would be displayed and right headlight boundary 801b would not be displayed. Areas 803 and 804 may be grayed out or darkened. If the right headlight 202b is already on and casting a beam according to a specified zone, then the right headlight 202b maintains the beam while the left headlight 202a is actuated.

With reference to FIGS. 9 and 12, it should be appreciated that the calibration map may be overlaid, similar to the boundaries 801, on the image. FIG. 9 shows the calibration map dividing the image displayed on the touchscreen 105a into zones. The boundaries 801 may be displayed (e.g., as steps) and the dead areas may be grayed out. The maps for the left headlight and the right headlight may be overlaid on the image according to the same geometry (e.g., as shown in FIG. 9 or FIG. 12), but the zones of the right headlight would link to reversed or mirrored operations as compared with the zones of the left headlight.

As stated above, the user may touch on a pixel of the image. In response, the vehicle 200 recasts or sweeps the selected headlight(s) to the selected location. Alternatively, as shown in FIG. 10, the user may drag an icon along the image, generating a manual sweep following the path of the drag.

Figure 10:
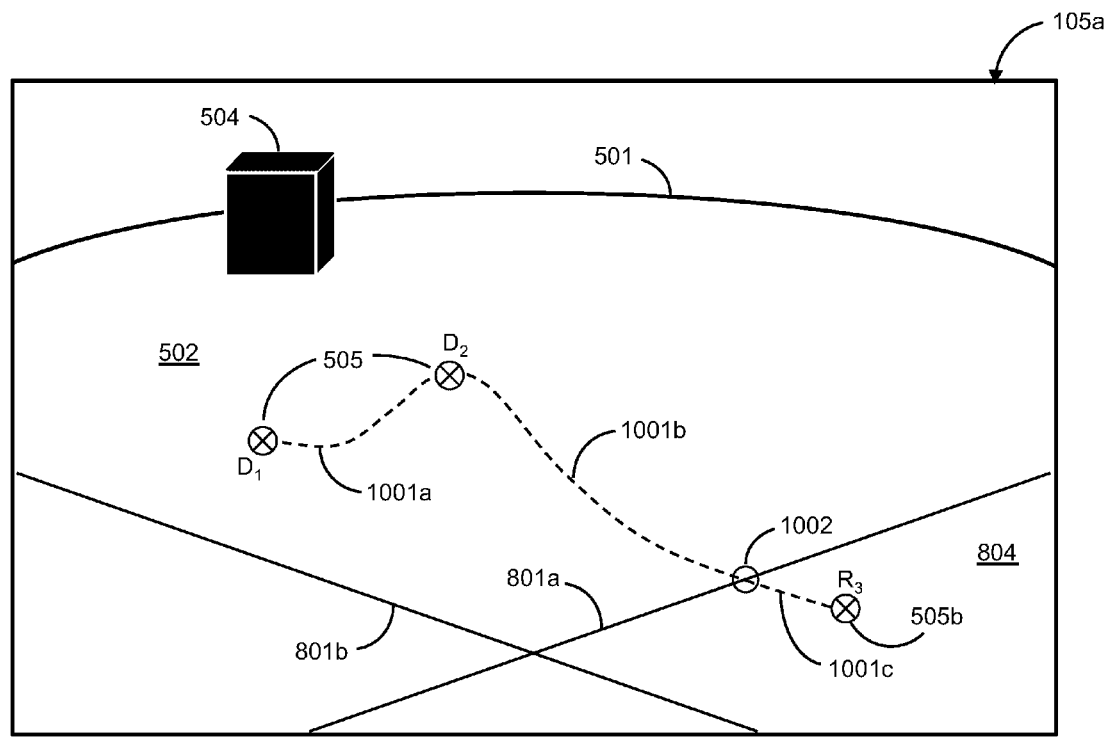

In FIG. 10, the user toggled to dual-mode and placed a dual icon 505 at D1. The user then dragged the dual icon 505 along path 1001a to D2. After D2, the user dragged the dual icon 505 along paths 1001b and 1001c to R3. Note that R3 is within area 804, which is a dead area for the left headlight 202a. Thus, the vehicle automatically removes the "D" automatically displayed above the dual icon 505 and automatically displays an "R" above the right icon 505b. The "R" conveys that only the right headlight is pointing according to icon 505b. Instead of "D", "R", and "L" letters, the vehicle may simply change the color or geometry of the icon. For example: green icons may correspond to dual-mode; red icons may correspond to left mode; blue icons may correspond to right mode.

As the user drags the icon 505 along path 1001b, the icon 505 reaches the left headlight boundary 801a at point 1002. At point 1002, the left headlight 202a turns off and icon 505 with the "D" changes to icon 505b with the "R."

Figure 11:
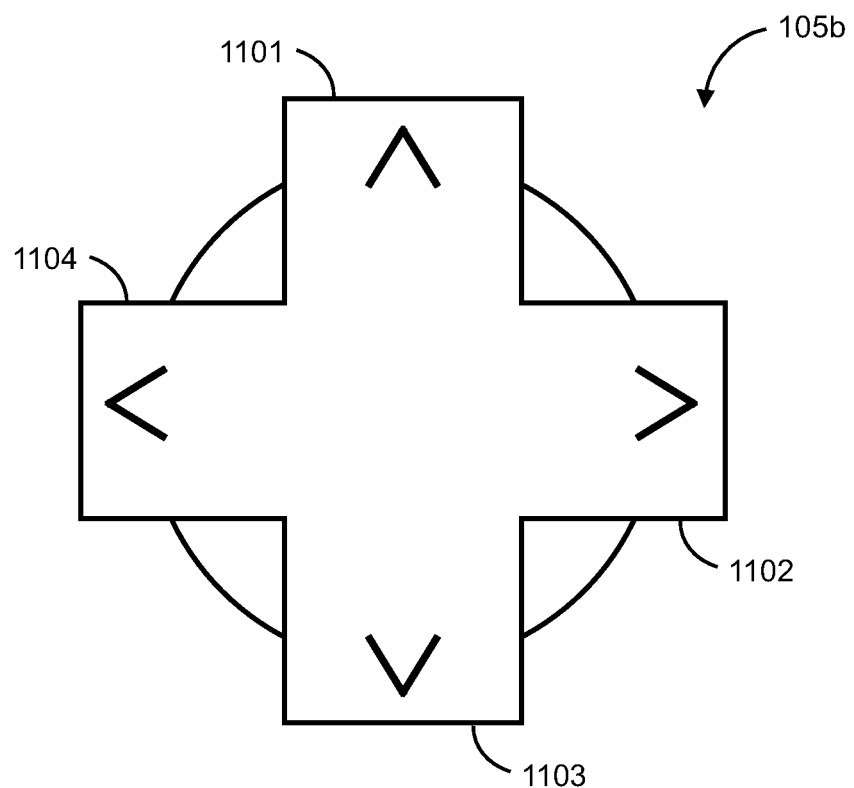
FIG. 11 shows a directional button.

FIG. 11 generally shows and illustrates a directional keypad 105b. The directional button 105b enables, via directional keys 1101 to 1104, user adjustment of one or both headlights (as selected via the toggle). Instead of pressing on the image via the touchscreen 105a, the user may actuate the selected headlight(s) via the directional button 105b. According to various embodiments, a click on a directional key (e.g., upward key 1101) causes the selected headlight(s) to transition to an adjacent zone (e.g., upward key 1101 causes the selected headlight(s) to move up one zone). The directional button 105b may be displayed on the touchscreen 105a or may be a separate physical button mounted, for example, on the dashboard or the steering wheel. If the directional button 105*b* is displayed on the touchscreen 105*a*, then the directional button 105*b* is virtual. If the virtual directional button 105*b* is overlaid on the image, then the virtual directional button 105*b* may be transparent and user-moveable.

Although the invention has been applied to headlights, as discussed above, it should be appreciated that the invention may apply to other sources of light, such as rear vehicle lights (or any other light source). Vehicles typically include at least two kinds of rear lights: brake lights, which activate when the vehicle brakes, and tail lights, which activate simultaneously with the headlights (i.e., the tail lights are intended to be always active when the vehicle is driving at night).

The invention claimed is:

1. A vehicle comprising:
   a headlight configured to produce a beam;
   a camera configured to capture images in front of the vehicle;
   a touchscreen configured to display the images; and
   processor(s) configured to:
   (a) display the images captured by the camera on the touchscreen;
   (b) control the headlight to move the beam according to touch inputs on the images; and
   (c) disable (b) when the vehicle exceeds a predetermined speed.

2. The vehicle of claim 1, wherein the processor(s) are configured to:
   recast the beam by sweeping the beam from an original position to a final position.

3. The vehicle of claim 2, wherein the headlight includes a main headlight and a plurality of supplemental headlights, and the processor(s) are configured to sweep the beam from the original position to the final position by sequencing through a series of beams, each beam of the series of beams being associated with a power level to the main headlight and each of the plurality of supplemental headlights.

4. The vehicle of claim 1, wherein the processor(s) are configured to:
   recast the beam according to a calibration map.

5. The vehicle of claim 4, wherein the calibration map divides the images into a plurality of zones.

6. The vehicle of claim 5, wherein a plurality of the zones are each associated with a single beam and wherein a plurality of the zones are each associated with no beam.

7. The vehicle of claim 6, wherein the processor(s) are configured to: control the headlight to produce the single beams, each single beam either being associated with (a) power level(s) to the headlight or (b) an angle of the headlight.

8. The vehicle of claim 1, wherein the processor(s) are configured to:
   recast the beam by sequencing the headlight through a plurality of beams, including an original beam, intermediate beams, and a final beam.

9. The vehicle of claim 8, wherein each of the original beam, the intermediate beams, and the final beams are associated different power levels to the headlight.

10. The vehicle of claim 8, wherein the processor(s) are configured to: recast the beam according to a calibration map dividing the images into a plurality of zones, including a first zone, second zones, and a third zone.

11. The vehicle of claim 10, wherein the original beam is associated with the first zone, the intermediate beams are associated with the second zones, and the final beam is associated with the third zone.

12. The vehicle of claim 11, wherein the processor(s) are configured to: determine a segment extending from the first zone to the third zone.

13. The vehicle of claim 12, wherein the processor(s) are configured to: determine zones between the first zone and the third zone intersected by the extended segment and set the determined zones as the second zones.

14. The vehicle of claim 13, wherein the processor(s) are configured to: for each of the second zones: apply the second zone for a time based on a length of the segment intersecting the second zone.

15. The vehicle of claim 1, wherein the headlight is a first headlight that produces a first beam and the vehicle includes a second headlight that produces a second beam; wherein the processor(s) are configured to: enable the first and second beams to be independently recast.

16. The vehicle of claim 15, wherein the processor(s) are configured to:
   overlay boundaries corresponding to identify headlight dead areas over the images.

17. The vehicle of claim 16, wherein the processor(s) are configured to: enable the user to place, over the images: (a) a first icon corresponding to a first headlight only mode; (b) a second icon corresponding to a second headlight only mode; (c) a third icon corresponding to a dual headlight mode.

18. The vehicle of claim 17, wherein the processor(s) are configured to: in response to a user placing the third icon in one of the identified dead areas, automatically switch the third icon to either the first icon or the second icon.

19. The vehicle of claim 1, including a directional keypad; wherein the processor(s) are configured to: recast the beam according to inputs on the directional keypad.

20. A method of operating a vehicle comprising:
   (a) capturing, via at least one camera, images in front of the vehicle
   (b) displaying the images captured by the at least one camera on a touchscreen;
   (c) controlling a headlight to move a beam produced by the headlight according to touch inputs on the images; and
   (d) disabling (c) when the vehicle exceeds a predetermined speed.

* * * * *